United States Patent [19]

Brodsky

[11] Patent Number: 5,676,421
[45] Date of Patent: Oct. 14, 1997

[54] VEHICLE SEAT ENERGY ABSORBING MECHANISM

[75] Inventor: Stephen L. Brodsky, New Boston, Mich.

[73] Assignee: Lear Corporation, Southfield, Mich.

[21] Appl. No.: 667,112

[22] Filed: Jun. 20, 1996

[51] Int. Cl.$^6$ ........................................ B60N 2/42
[52] U.S. Cl. .................... 297/216.13; 297/216.19; 297/378.11; 297/216.14; 403/2
[58] Field of Search .................... 297/216.1, 216.13, 297/216.14, 216.19, 378.11; 403/2

[56] References Cited

U.S. PATENT DOCUMENTS

| | | |
|---|---|---|
| 1,778,477 | 10/1930 | Wood . |
| 3,112,955 | 12/1963 | Stolz . |
| 3,711,153 | 1/1973 | Cunningham . |
| 3,866,270 | 2/1975 | Suzuki et al. . |
| 4,010,705 | 3/1977 | Connell et al. . |
| 4,086,012 | 4/1978 | Buckley et al. . |
| 4,236,750 | 12/1980 | Moritz . |
| 4,394,047 | 7/1983 | Brunelle . |
| 4,408,738 | 10/1983 | Mazelsky . |
| 4,423,848 | 1/1984 | Mazelsky . |
| 4,449,875 | 5/1984 | Brunelle . |
| 4,659,267 | 4/1987 | Uno et al. . |
| 4,674,907 | 6/1987 | Shewchuk ........................ 403/2 |
| 4,676,555 | 6/1987 | Tokugawa . |
| 4,919,482 | 4/1990 | Landis et al. . |
| 4,938,319 | 7/1990 | Ernst . |
| 5,306,073 | 4/1994 | Rees . |
| 5,310,030 | 5/1994 | Kawakita et al. .................. 297/216.1 |
| 5,320,308 | 6/1994 | Bilezikjian et al. . |
| 5,340,185 | 8/1994 | Vollmer . |
| 5,370,440 | 12/1994 | Rogala . |

FOREIGN PATENT DOCUMENTS

| | | | |
|---|---|---|---|
| 2152104 | 4/1973 | Germany | ............... 297/216.1 |
| 57-144150 | 9/1982 | Japan . | |
| 404353036 | 12/1992 | Japan . | |

OTHER PUBLICATIONS

Flight Magazine, "Automatic Seat–Belt Release", Jul. 17, 1953.

Primary Examiner—Peter M. Cuomo
Assistant Examiner—Anthony D. Barfield
Attorney, Agent, or Firm—Brooks & Kushman P.C.

[57] ABSTRACT

A vehicle seat assembly is provided with an energy absorption mechanism for dissipating energy in a high energy impact. The assembly includes a seat with a seat back totally connected thereto. The seat back includes a first support member pivotally connected with respect to the seat and a second support member pivotally connected to the first support member. An energy absorption mechanism is positioned between the first and second support members for dissipating energy as the second support member pivots with respect to the first support member. The energy absorption mechanism includes a plurality of adjustable shear pins having shearable cross-sections of various sizes to facilitate adjustment based upon the seat back angle. The shear pins are movable in a plurality of slots sequentially increasing in length such that the shear pins will sequentially shear to dissipate energy over time as the respective shear pins reach the end of their respective slots.

11 Claims, 4 Drawing Sheets

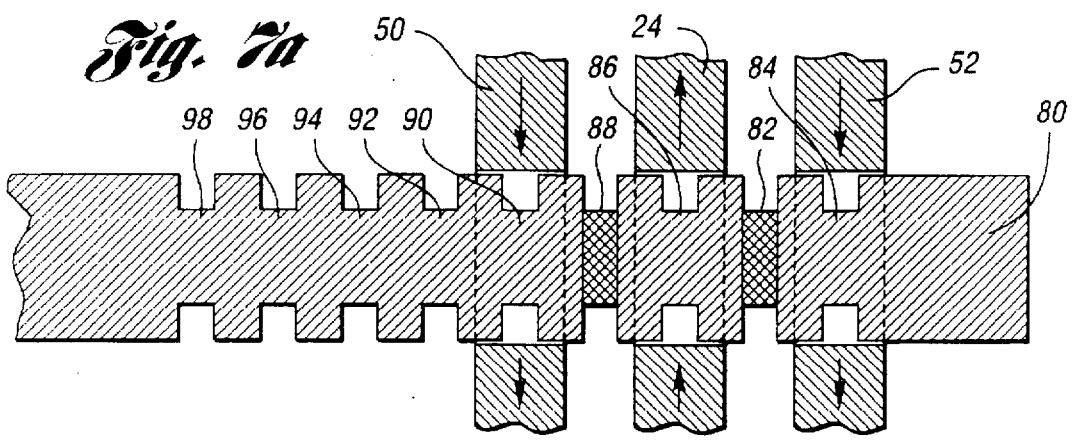
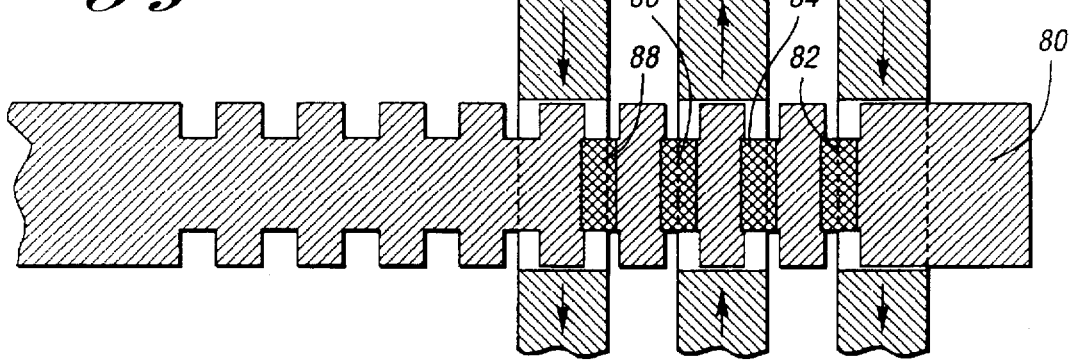
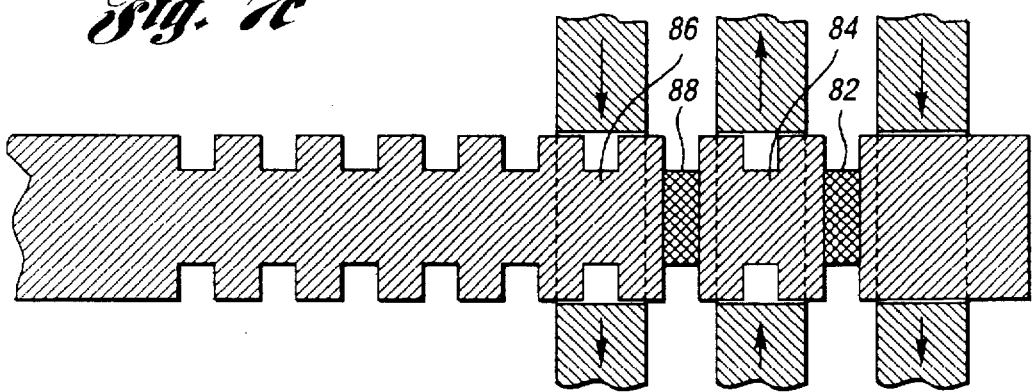
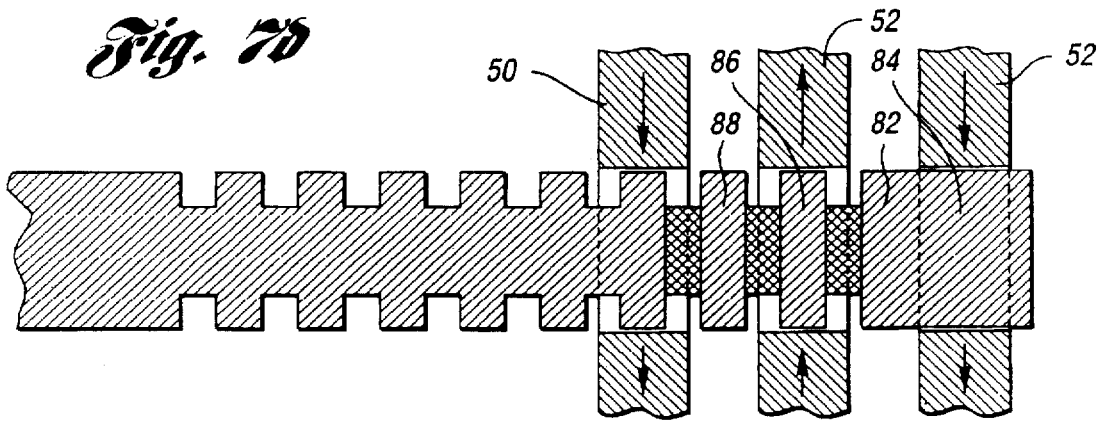

VEHICLE SEAT ENERGY ABSORBING MECHANISM

TECHNICAL FIELD

The present invention relates to a vehicle seat assembly, and more particularly to an energy absorbing mechanism for a vehicle seat assembly.

BACKGROUND OF THE INVENTION

Typically, vehicle occupants are belted to the vehicle seat in a manner in which the seatbelt is at least partially secured to the top portion of the seat back. Accordingly, in a high energy impact situation, the energy of the vehicle occupant is transmitted to the seat back in both frontal and rear collisions. In a frontal collision, the vehicle occupant is thrown forward, and the seatbelt transfers their energy to the seat back. In a rear collision, the vehicle occupant is thrown backward against the seat back.

Prior art devices have been provided for dissipating such energy in a high energy impact situation. Typically, these devices are disposed about the recliner pivot axis, and include a single shear pin which shears when a predetermined amount of shear force is applied. In this type of arrangement, the vehicle occupant experiences a single point of energy dissipation as the shear pin is sheared. By dissipating the energy of the occupant in a single shearing event, the occupant experiences a large instantaneous deceleration, which is undesirable.

It is desirable to dissipate the seat back energy in a controlled manner in which the peak shear force is reduced, and the occupant's energy is dissipated over a period of time, rather than during a single shearing event.

Furthermore, the required amount of energy dissipation varies with the seat back angle. Therefore, it is desirable to provide an energy absorption mechanism with the capability of adjusting shear force based upon the seat back angle.

DISCLOSURE OF THE INVENTION

The present invention overcomes the above referenced shortcomings of prior art seat energy absorption assemblies by providing an energy absorption assembly comprising a plurality of shear pins which sequentially dissipate energy over a period of time. The energy absorption mechanism provides adjustable shear force and energy absorption based upon varying seat back angles. This energy absorption mechanism is effective in both frontal and rear collisions.

More specifically, the present invention provides a vehicle seat assembly for dissipating energy, comprising a seat with a seat back pivotally connected thereto. The seat back includes a first support member pivotally connected with respect to the seat and a second support member pivotally connected to the first support member about a pivot axis. An energy absorption mechanism is positioned between the first and second support members about the pivot axis for dissipating energy as the second support member pivots with respect to the first support member.

In a preferred embodiment, the energy absorption mechanism includes first and second shear plates connected with respect to the first support member and having a plurality of apertures formed therethrough. A plurality of shear pins having shearable cross-sections formed therein cooperate with the apertures. The second support member comprises a plurality of circumferential slots formed therethrough of sequentially increasing length for cooperation with the shear pins, whereby the shearable cross-sections may be sequentially sheared as the second support member pivots with respect to the first support member to cause the pins to move within the slots and shear when they reach the ends of the slots. The shearable cross-sections of the shear pins sequentially increase in cross-sectional shear area from the pin cooperating with the shortest of the slots to the pin cooperating with the longest of the slots. A movable adjustment plate is secured to the shear pins, and an adjustment bolt is secured with respect to the first support member along the pivot axis for moving the adjustment plate and shear pins, whereby to align selected shearable cross-sections for shearing as the seat back is pivoted in a high-energy impact.

In the preferred embodiment, the shear pins are normally disposed in the center of the circumferential slots for movement in either direction such that the energy absorption mechanism may dissipate energy in both rear and frontal collisions.

Accordingly, an object of the present invention is to provide a vehicle seat energy absorption mechanism for dissipating energy in a high energy vehicle impact in which the peak shear force is reduced, and energy is absorbed sequentially over a series of shearing events.

A further object of the present invention is to provide a vehicle seat energy absorption assembly with the ability to adjust the amount of shear force required based upon the seat back angle.

A further object of the present invention is to provide a vehicle seat energy dissipating mechanism which dissipates energy in both frontal or rear collisions.

The above objects and other objects, features and advantages of the present invention are readily apparent from the following detailed description of the best mode for carrying out the invention when taken in connection with the accompanying drawings.

BRIEF DESCRIPTION OF THE DRAWINGS

FIG. 7a–7d show sequential cut-away vertical cross-sectional views of an alternative shear pin arrangement in accordance with the present invention.

DETAILED DESCRIPTION OF THE PREFERRED EMBODIMENT

Figure 1:
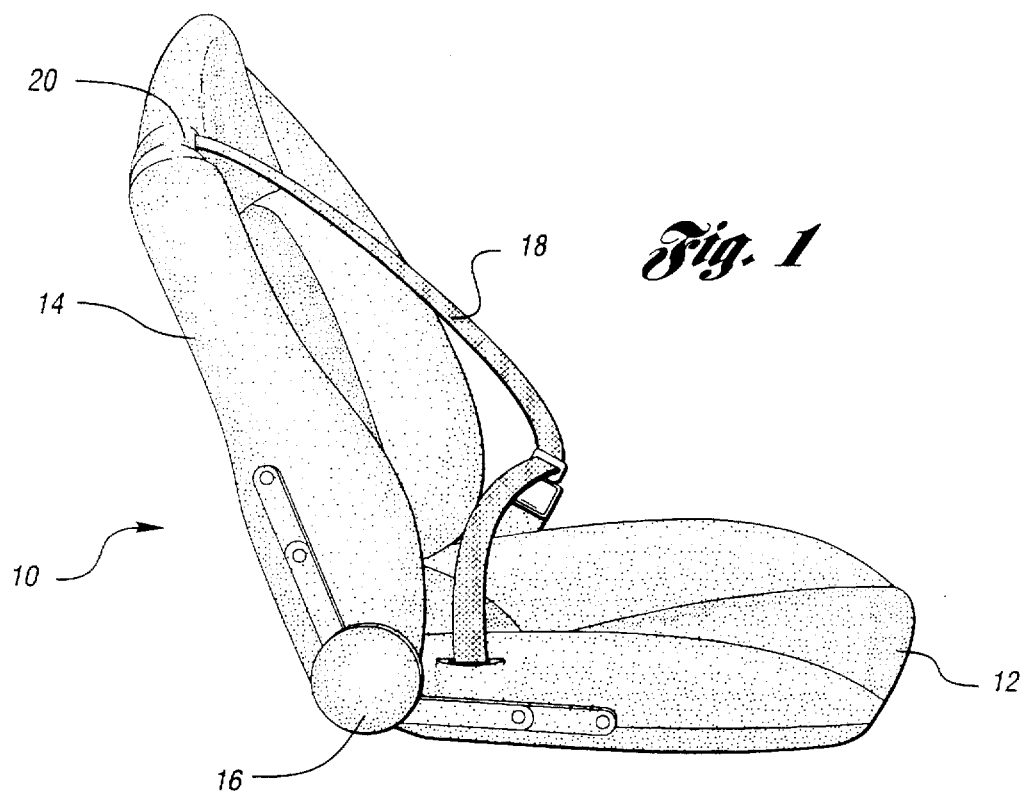
FIG. 1 shows a perspective view of a vehicle seat assembly in accordance with the present invention.

Referring to FIG. 1, a vehicle seat assembly 10 is shown in accordance with the present invention. The vehicle seat assembly 10 includes a seat 12, and a seat back 14 pivotally connected to the seat 12 at the recliner mechanism 16. The embodiment shown includes an integrated restraint system wherein the seatbelt 18 is integral with the seat assembly 10, such that the seatbelt 18 is secured to the top portion 20 of the seat back 14. In this configuration, energy is transferred from the seatbelt 18 to the seat back 14 in a front end collision.

Figure 2:
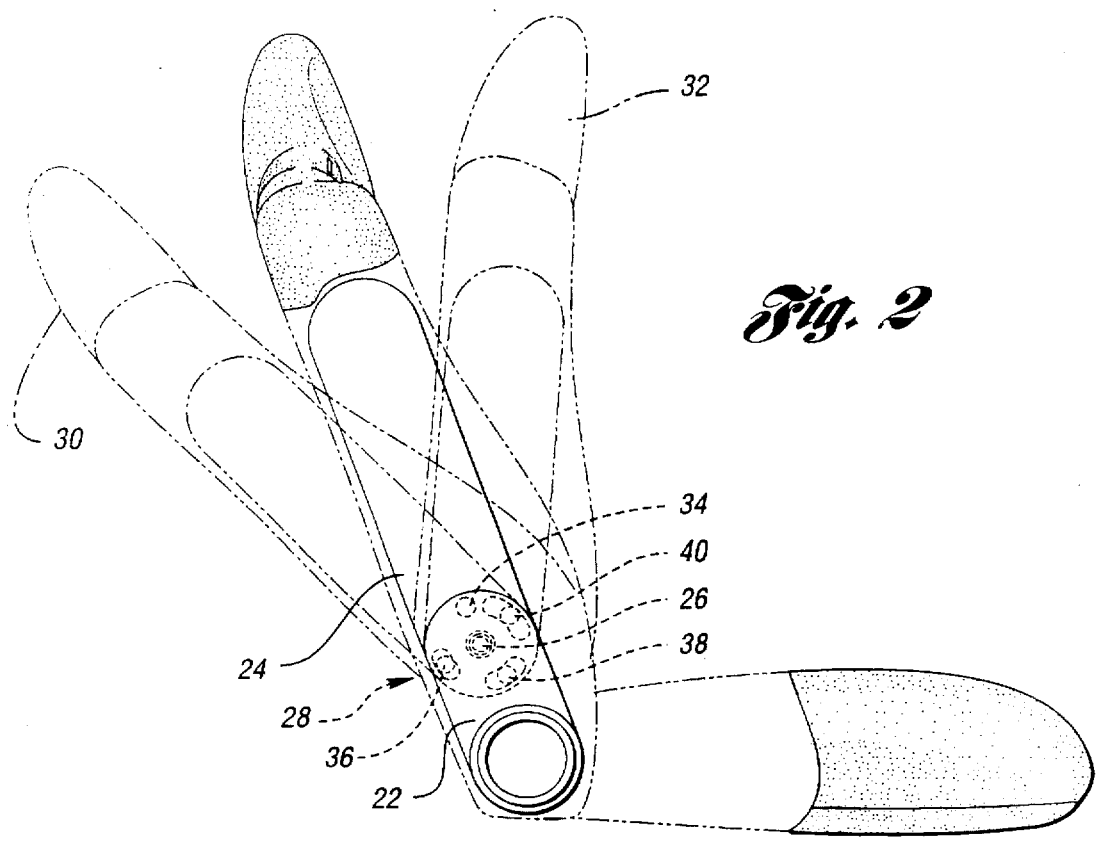
FIG. 2 shows a partially cut-away side view of the vehicle seat assembly shown in FIG. 1.
Figure 3:
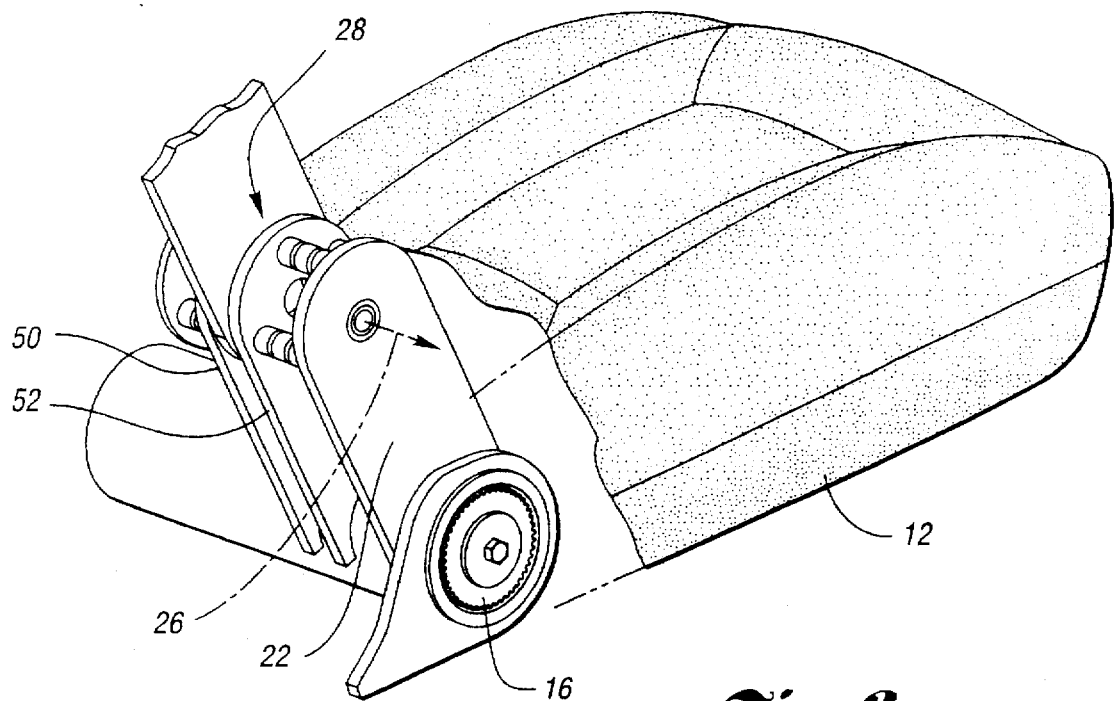
FIG. 3 shows a cut-away perspective view of a vehicle seat assembly and energy absorption mechanism in accordance with the present invention.

As shown in FIGS. 1-3, the seat back 14 includes a first support member 22 pivotally connected with respect to the seat 12 at the recliner 16. A second support member 24 is pivotally connected to the first support member 22 about a pivot axis 26. An energy absorption mechanism 28 is positioned between the first and second support members 22, 24 about the pivot axis 26 for dissipating energy as the second support. member 24 pivots with respect to the first support member 22.

Figure 4:
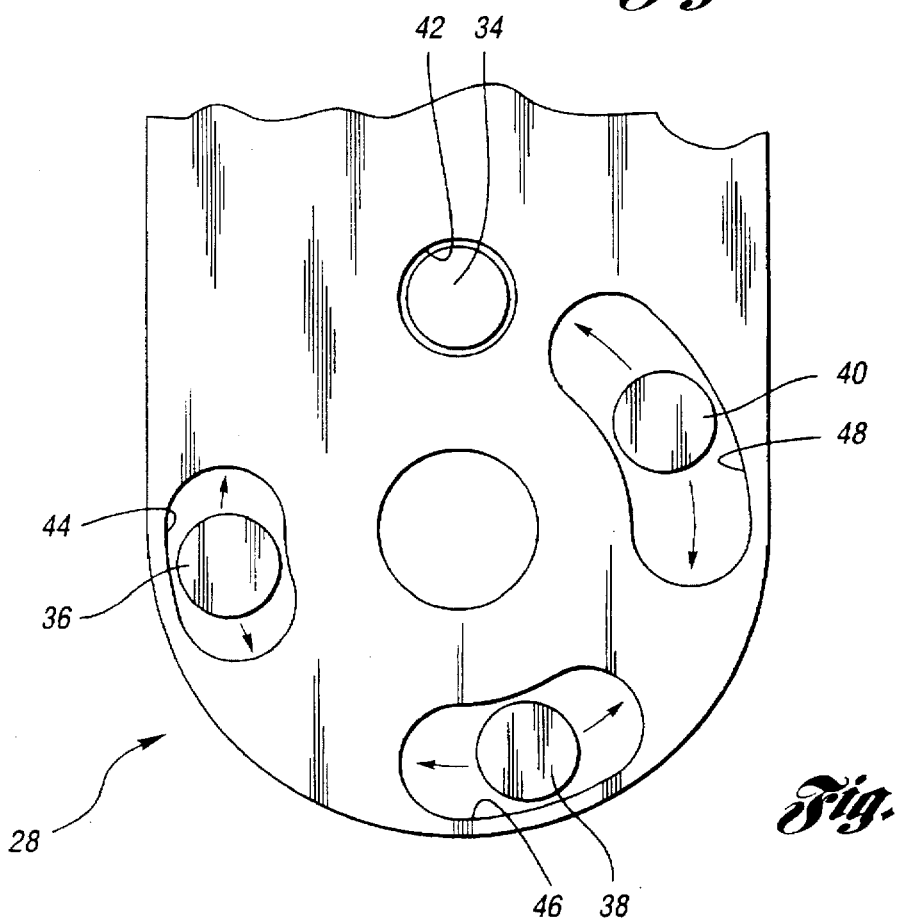
FIG. 4 shows a vertical sectional view of the energy absorption mechanism shown in FIG. 3.

The energy absorption mechanism is configured to dissipate energy as the second support member 22 pivots rearward toward a second position 30 (shown in phantom in FIG. 2) or forward to a third position 32 (shown in phantom in FIG. 2). The energy absorption mechanism 28 includes a plurality of shear pins 34, 36, 38, 40 which are slidable in their respective slots 42, 44, 46, 48 for shearing when they reach the end of the respective slot, as shown more clearly in FIG. 4.

Figure 5:
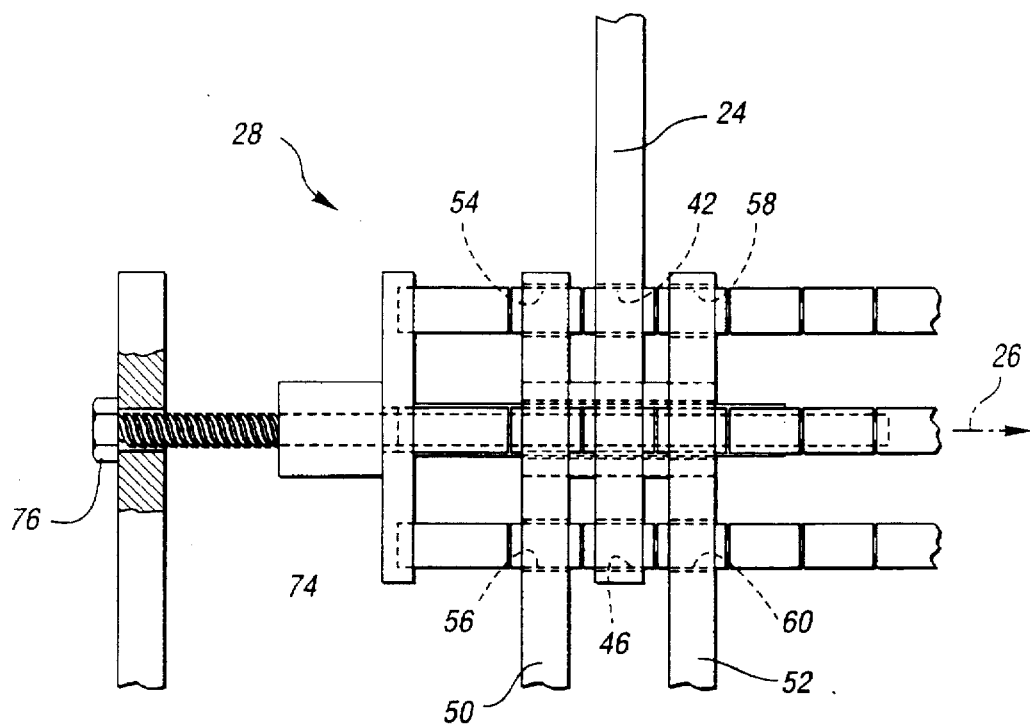
FIG. 5 shows a cut-away sectional view of the energy absorption mechanism of FIG. 3.
Figure 6:
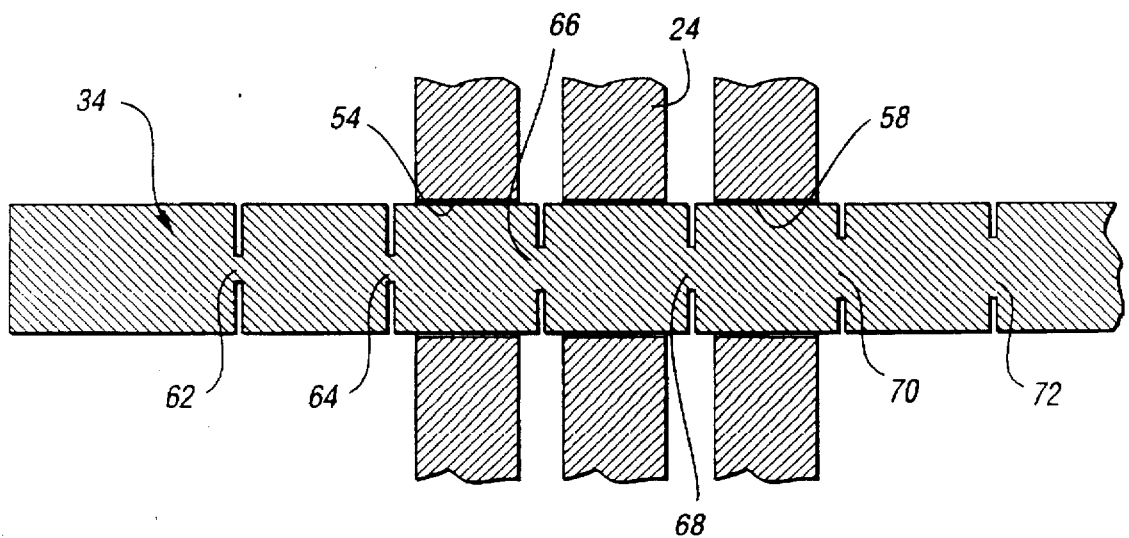
FIG. 6 shows an enlarged cut-away sectional view of the energy absorption mechanism shown in FIG. 5.

The energy absorption mechanism 28 further includes first and second shear plates 50, 52 connected with respect to the first support member 22 and having a plurality of apertures 54, 56, 58, 60 formed therethrough for cooperation with the shear pins 34, 36, 38, 40, as shown in FIGS. 5-6. As shown in FIG. 6, the shear pins 34, 36, 38, 40 include shearable cross-sections 62, 64, 68, 70, 72, 74 which increase in cross-sectional area along the length of the shear pin. Furthermore, the shearable cross-sections sequentially increase in cross-sectional area from the pin 34 cooperating with the shortest of said slots 42 to the pin 40 cooperating with the longest of said slots 48. In this configuration, the shearable cross-sections increase step-wise in shear area sequentially, and are accordingly sheared sequentially as the second support member 24 pivots with respect to the first support member 22 in a high energy impact.

The energy absorption mechanism 28 further includes a movable adjustment plate 74 which is secured to the shear pins 34, 36, 38, 40. An adjustment bolt 76 is secured with respect to the first support member 22 along the pivot axis 26 for moving the adjustment plate 74 and shear pins 34, 36, 38, 40 whereby to align selected shearable cross-sections for shearing.

An appropriate mechanism may be provided for rotating the adjustment bolt 76 as the first support member 22 pivots with respect to the seat 12 such that the energy absorption mechanism 28 may be automatically adjusted as the operator adjusts the seat back angle. In this manner, the shearing force of the energy absorption mechanism 28 may be adjusted for various seat back angles as the adjustment plate 74 is moved in and out to align differently sized shearable cross-sections 62, 64, 66, 68, 70, 72 of the shear pins with the second support member 24 for shearing in a high energy impact situation.

In a high energy impact, the occupant's energy is translated to the seat back 14, which causes the second support member 24 to begin rotating with respect to the first support member 22. As the second support member 24 pivots with respect to the first support member 22, the first and second shear plates 50, 52 remain in position such that the shear pins 34, 36, 38, 40 will be sequentially sheared at the shearable cross-sections which are aligned between the shear plates 50, 52 as the respective shear pins 34, 36, 38, 40 reach the end of their respective slots 42, 44, 46, 48.

FIGS. 7a-7d illustrate an alternative embodiment of a shear pin 80, which is movable with respect to the shear plates 50, 52 and support member 24 for shearing. The shear pin 80 includes slightly elongated shear sections 82, 84, 86, 88, 90, 92, 94, 96, 98. The elongated shear sections allow the shear pin 80 to be linearly moved in either direction while the seat back is pivoted to adjust shear force, rather than requiring step-wise movement to align the appropriate shear sections with the shear plates 50, 52 and support member 24. In the position shown in FIG. 7a, shear sections 84 and 88 are appropriately aligned for shearing. As the shear pin 80 moves to the position shown in FIG. 7b, shear areas 82, 84, 86, and 88 are aligned for shearing, however only the thinnest of shear areas 82 and 84 will shear, and the thinnest of shear areas 86 and 88 will shear. In the position shown in FIG. 7c, shear areas 82 and 86 are aligned for shearing. In the position shown in FIG. 7d, shear area 82 is aligned for shearing between shear plate 52 and support member 24, while both shear areas 84 and 86 are aligned between plates 50 and 24 for shearing. However, only shear area 82 and the thinnest of shear areas 84 and 86 will be sheared. Accordingly, in this configuration, the shear pin 80 may be actuated linearly, rather than step-wise, for appropriately aligning the shear areas for increasing or decreasing the required shear force for shearing.

While the best mode for carrying out the invention has been described in detail, those familiar with the art to which this invention relates will recognize various alternative designs and embodiments for practicing the invention within the scope of the appended claims.

What is claimed is:

1. A vehicle seat assembly for dissipating energy in a high-energy vehicle impact, comprising:

a seat;

a seat back pivotally connected with respect to the seat, said seat back including a first support member pivotally connected with respect to the seat and a second support member pivotally connected to the first support member about a pivot axis;

an energy absorption mechanism positioned between said first and second support members about said pivot axis for dissipating energy as said second support member pivots with respect to said first support member; and wherein said energy absorption mechanism comprises:

a plurality of shear pins having shearable cross-sections formed therein;

first and second shear plates connected with respect to said first support member and having a plurality of apertures formed therethrough for cooperation with said plurality of shear pins; and wherein said second support member comprises a plurality of circumferential slots formed therethrough of sequentially increasing length for cooperation with said shear pins, whereby said shearable cross-sections may be sequentially sheared as said second support member pivots with respect to said first support member in a high-energy impact.

2. The vehicle seat assembly of claim 1, wherein said shearable cross-sections of said shear pins sequentially increase in cross-sectional area from the pin cooperating with the shortest of said slots of sequentially increasing length to the pin cooperating with the longest of said slots.

3. The vehicle seat assembly of claim 1, wherein said energy absorption mechanism further comprises:

a movable adjustment plate secured to said plurality of shear pins;

wherein each of said plurality of shear pins comprises a plurality of shearable cross-sections of varying cross-sectional areas; and an adjustment bolt secured with respect to said first support member along said pivot axis for moving said adjustment plate and shear pins whereby to align selected shearable cross-sections for shearing.

4. The vehicle seat assembly of claim 1, wherein said energy absorption mechanism is capable of absorbing energy as said second support member pivots both toward and away from said seat.

5. The vehicle seat assembly of claim 1, wherein said seat back comprises a top portion and said seat assembly further comprises an integrated restraint system integral with said seat assembly including a seatbelt secured to said top portion for transferring occupant energy to the seat back.

6. A vehicle seat assembly for dissipating energy in a high-energy vehicle impact, comprising:

a seat;

a seat back pivotally connected with respect to the seat, said seat back including a first support member pivotally connected with respect to the seat and a second support member pivotally connected to the first support member about a pivot axis;

an energy absorption mechanism disposed about said pivot axis for dissipating energy as said second support member pivots with respect to said first support member; and wherein said energy absorption mechanism comprises:
 a plurality of shear pins having shearable cross-sections formed therein;
 first and second shear plates connected with respect to said first support member and having a plurality of apertures formed therethrough for cooperation with said plurality of shear pins; and
 wherein said second support member comprises a plurality of circumferential slots formed therethrough of sequentially increasing length for cooperation with said shear pins, whereby said shearable cross-sections may be sequentially sheared as said second support member pivots with respect to said first support member.

7. The vehicle seat assembly of claim 6, wherein said shearable cross-sections of said shear pins sequentially increase in cross-sectional area from the pin cooperating with the shortest of said slots of sequentially increasing length to the pin cooperating with the longest of said slots.

8. The vehicle seat assembly of claim 6, wherein said energy absorption mechanism further comprises:

a movable adjustment plate secured to said plurality of shear pins;

wherein each of said plurality of shear pins comprises a plurality of shearable cross-sections of varying cross-sectional areas; and an adjustment bolt secured with respect to said first support member along said pivot axis for moving said adjustment plate and shear pins whereby to align selected shearable cross-sections for shearing.

9. The vehicle seat assembly of claim 6, wherein said energy absorption mechanism is capable of absorbing energy as said second support member pivots both toward and away from said seat.

10. The vehicle seat assembly of claim 6, wherein said seat back comprises a top portion and said seat assembly further comprises an integrated restraint system integral with said seat assembly including a seatbelt secured to said top portion for transferring occupant energy to the seat back.

11. A vehicle seat assembly for dissipating energy in a high energy vehicle impact, comprising:

a seat;

a seat back pivotally connected with respect to the seat, said seat back including a first support member pivotally connected with respect to the seat and a second support member pivotally connected to the first support member about a pivot axis;

first and second shear plates connected with respect to said first support member and having a plurality of apertures formed therethrough;

a plurality of shear pins having shearable cross-sections formed therein, said shear pins cooperating with said plurality of apertures; and wherein said second support member comprises a plurality of circumferential slots formed therethrough of sequentially increasing length for cooperation with said shear pins, whereby said shearable cross-sections may be sequentially sheared as said second support member pivots with respect to said first support member for dissipating energy of the seat back in a high energy vehicle impact.

* * * * *